K. PEISELER.
CHAIN OR RING MANUFACTURE.
APPLICATION FILED APR. 29, 1913.
1,168,328.                    Patented Jan. 18, 1916.
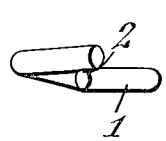
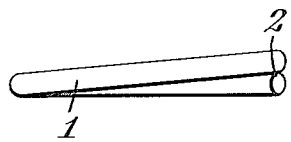
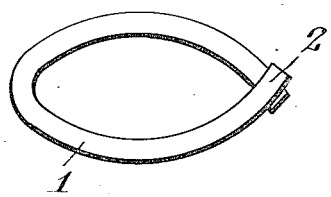
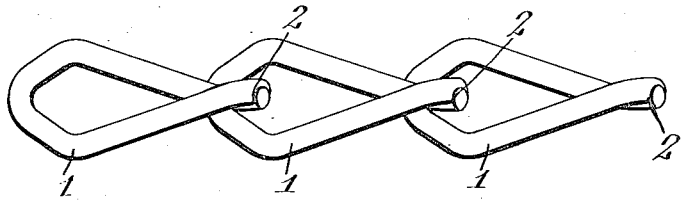
WITNESSES
F. B. Townsend
K. M. McMahon.
INVENTOR
KUNO PEISELER
BY
Townsend & Decker
ATTORNEYS

UNITED STATES PATENT OFFICE.

KUNO PEISELER, OF FRANKFORT-ON-THE-MAIN, GERMANY, ASSIGNOR TO THOMSON ELECTRIC WELDING COMPANY, OF LYNN, MASSACHUSETTS, A CORPORATION OF MASSACHUSETTS.

CHAIN OR RING MANUFACTURE.

1,168,328.

Specification of Letters Patent.  Patented Jan. 18, 1916.

Application filed April 29, 1913. Serial No. 764,338.

*To all whom it may concern:*

Be it known that I, KUNO PEISELER, a subject of the Emperor of Germany, and a resident of Frankfort-on-the-Main, in the Empire of Germany, have invented certain new and useful Improvements in Chain or Ring Manufacture, of which the following is a specification.

This invention relates to a new form of endless ring or link, particularly the links of a chain.

The main object of the invention is to cheapen the cost of production of chains by increasing the speed at which the individual links can be welded and at the same time maintain an efficient, neat-appearing chain.

It is a further object to produce a chain which can be made on a very simple and cheap welding apparatus and an apparatus that can be handled by an unskilled operator, thus further reducing the cost.

Heretofore chains have been made up of links, the ends of which are either butt-welded or lap-welded, the electric welding process being utilized for purposes of speed, economy and efficiency. In butt-welding it is necessary to have special forms of holders and upsetting devices and the heating period is necessarily long, thus making the machine both expensive to build and expensive to operate. In the lap-welding process it is necessary to first shape the ends of the link (as for a scarf weld) and then provide a nicety of adjustment to bring the ends properly one over the other. Also a considerable amount of current is necessary as quite an area of metal is in contact.

By this invention, the necessity of specially preparing the ends of the blank as in lap-welding is obviated and the utilization of a large consumption of current as in butt-welding is avoided.

To these ends the invention consists in the improved article hereinafter more particularly described and then specified in the claim.

In the accompanying drawings, Figure 1 is an end elevation of a chain link assembled in accordance with this invention. Fig. 2 is a side elevation of the same. Fig. 3 is a plan view of the link. Fig. 4 is a plan view of a chain made in accordance with this invention, the individual links being twisted.

1 indicates a length of wire bent into the desired form and having its ends crossing or intersecting each other as at 2. At such crossing point the ends are welded together by means of an electric current passed from one wire to the other and pressure applied to the heated section afforded by the passage of the current, all as well understood in the electric metal working art. As will be readily understood by those skilled in the art, the restricted area of contact at the crossing point will allow the metal to quickly reach the welding heat and a quick, positive weld is effected on the application of the necessary pressure, applied transverse to the link 1.

In Fig. 4 is illustrated a section of a chain composed of links which are twisted, the links *per se* being formed in the same manner as before described.

It will be understood that rings or other continuous closed bodies of wire may be formed in the same way as the chain links described and that the invention is applicable thereto.

What I claim as my invention is:

A chain link composed of a single length of wire formed into a single loop having its ends crossing one over the other and electrically welded together at the intersecting point.

Signed at Frankfort-on-the-Main, in the Empire of Germany, this ninth day of April, A. D. 1913.

KUNO PEISELER.

Witnesses:
 KONRAD SCHMARJE,
 ERWIN WOLLNY.